United States Patent
Mylavarapu

(10) Patent No.: US 11,768,633 B2
(45) Date of Patent: *Sep. 26, 2023

(54) INVERSION REFRESH OF PHYSICAL MEMORY LOCATION

(71) Applicant: Micron Technology, Inc., Boise, ID (US)

(72) Inventor: Sai Krishna Mylavarapu, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/965,510

(22) Filed: Oct. 13, 2022

(65) Prior Publication Data

US 2023/0029959 A1 Feb. 2, 2023

Related U.S. Application Data

(63) Continuation of application No. 17/177,802, filed on Feb. 17, 2021, now Pat. No. 11,494,124.

(51) Int. Cl.
*G06F 3/06* (2006.01)

(52) U.S. Cl.
CPC .......... *G06F 3/0659* (2013.01); *G06F 3/0619* (2013.01); *G06F 3/0644* (2013.01); *G06F 3/0652* (2013.01); *G06F 3/0679* (2013.01); *G06F 2212/7209* (2013.01)

(58) Field of Classification Search
CPC .... G06F 3/0659; G06F 3/0619; G06F 3/0644; G06F 3/065; G06F 3/0679; G06F 2212/7209
See application file for complete search history.

(56) References Cited

U.S. PATENT DOCUMENTS

| | | |
|---|---|---|
| 11,494,124 B2 | 11/2022 | Mylavarapu |
| 2016/0005495 A1 | 1/2016 | Lasser |
| 2016/0110125 A1 | 4/2016 | Orme et al. |
| 2016/0110249 A1 | 4/2016 | Orme et al. |
| 2019/0087125 A1 | 3/2019 | Matsumoto et al. |
| 2019/0295666 A1 | 9/2019 | Parry et al. |
| 2022/0261184 A1 | 8/2022 | Mylavarapu |

FOREIGN PATENT DOCUMENTS

| | | |
|---|---|---|
| CN | 106170773 A | 11/2016 |
| CN | 109725848 A | 5/2019 |
| CN | 110928805 A | 3/2020 |
| CN | 111164566 A | 5/2020 |
| CN | 114942893 A | 8/2022 |

OTHER PUBLICATIONS

Cai, Yu, et al., "Flash Correct-and-Refresh", Retention-Aware Error Management for Increased Flash Memory Lifetime. Carnegie Mellon University, Journal contribution, [Online] Retrieved from the internet: <https://doi.org/10.1184/R1/6468821.v1>, 56 pgs.
"Chinese Application Serial No. 202210144458.9, Office Action dated Mar. 18, 2023", w/o English translation, 7 pgs.

*Primary Examiner* — Kalpit Parikh
(74) *Attorney, Agent, or Firm* — Schwegman Lundberg & Woessner, P.A.

(57) ABSTRACT

Various embodiments described herein provide for performing inversion refresh of a physical memory location of a memory device (e.g., memory cell on a negative-and (NAND)-type memory device) based on a state of the physical memory location. For some embodiments, the inversion refresh is performed as part of performing garbage collection or reclamation of physical memory locations of a memory device.

20 Claims, 9 Drawing Sheets

US 11,768,633 B2

INVERSION REFRESH OF PHYSICAL MEMORY LOCATION

PRIORITY APPLICATION

This application is a continuation of U.S. application Ser. No. 17/177,802, filed Feb. 17, 2021, which is incorporated herein by reference in its entirety.

TECHNICAL FIELD

Embodiments of the disclosure relate generally to memory devices and, more specifically, to inversion refresh of a physical memory location of a memory device, such as a memory cell of a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
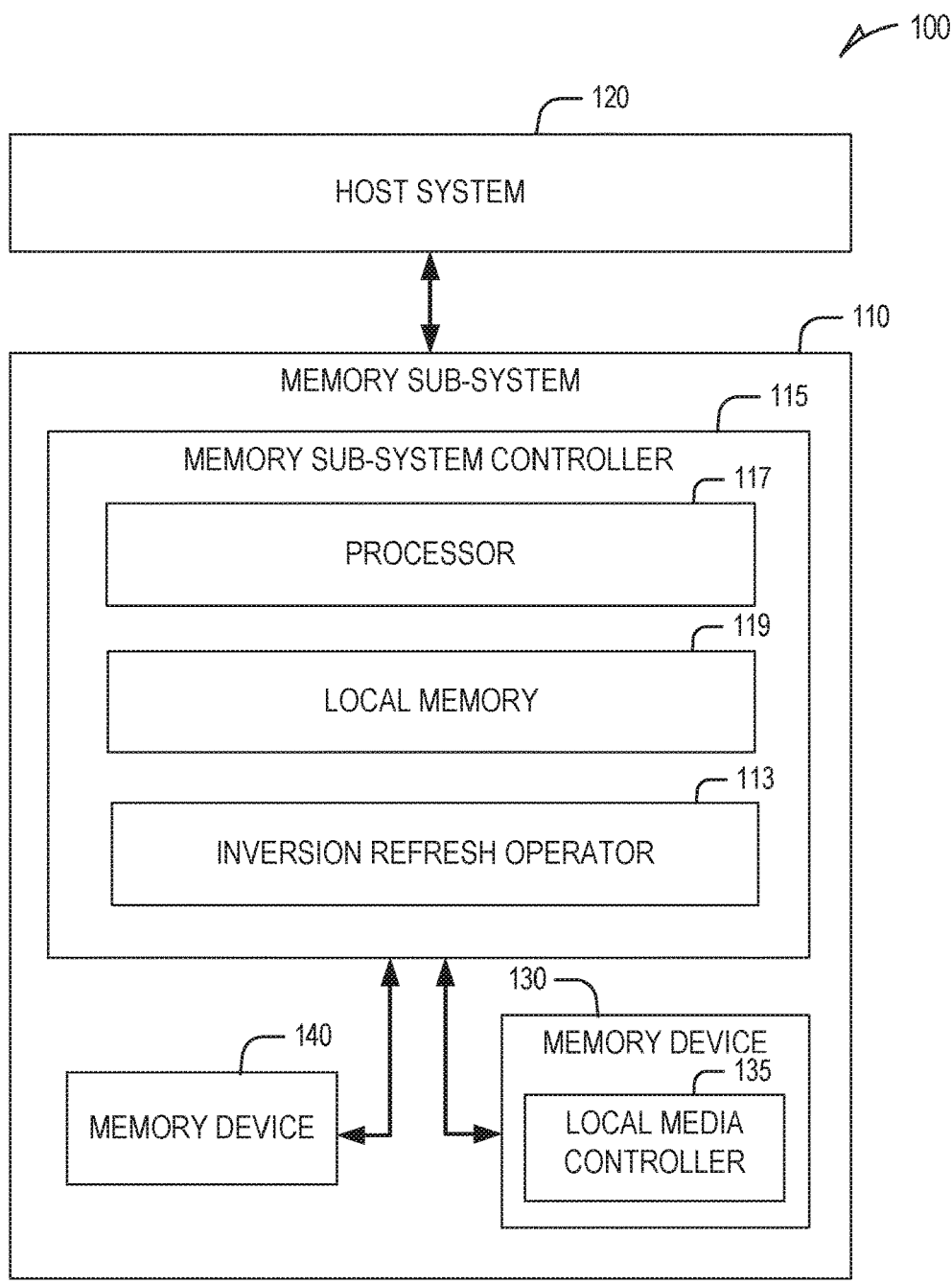
FIG. 1 is a block diagram illustrating an example computing system that includes a memory sub-system, in accordance with some embodiments of the present disclosure.

Aspects of the present disclosure are directed to performing inversion refresh of a physical memory location of a memory device (e.g., memory cell of a negative-and (NAND)-type memory device) based on a state of the physical memory location, where the memory device can be part of a memory sub-system. For some embodiments, the inversion refresh is performed as part of performing garbage collection or reclamation of physical memory locations of a memory device. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command,) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error-correcting code (ECC) codeword, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, and so forth.

A memory device can be a non-volatile memory device. A non-volatile memory device is a package of one or more die. Each die can be comprised of one or more planes. For some types of non-volatile memory devices (e.g., negative-and (NAND)-type devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package.

Some memory sub-systems use one or more non-volatile memory devices (e.g., NAND-based type memory devices, such as a three-dimensional cross-point memory device) comprising physical memory locations (e.g., memory cells) that need stored data to be periodically "refreshed" with inverted data (e.g., periodically cause the charges stored by the memory cells to ping-pong in binary state) in order for those non-volatile memory devices to reliably store data. This need for periodic inversion of data stored by a physical memory location (e.g., a memory cell of a memory device)

can be referred to as an inversion requirement, and the process of inverting data stored by one or more physical memory locations can be referred to as an inversion refresh process.

Various embodiments described herein provide for strategies for performing inversion refresh on one or more physical memory locations (e.g., media physical memory locations, such as memory cells of a NAND-type memory device) of a memory device (e.g., of a memory sub-system) based on states of those one or more physical memory locations. The state of a set of physical memory locations can include, without limitation: currently storing valid data; currently storing invalid data (e.g., currently storing data that was previously valid but now marked as invalid, such as after data move by a garbage collection process); defective (e.g., memory cell is marked as defective); and available or free for use for data storage (e.g., does not currently store valid data or previously valid data, not marked as defective, and available to be written to). These example states can be applicable to a memory device operating under a sequential mode access model. Some embodiments enable continuous health assessment and maintenance of one or more physical memory locations (e.g., memory media locations) of a memory device by, periodically: determining a state of the one or more physical memory locations; and based on the determined state, reading data, inverting data, writing inverted data back to the one or more physical memory locations, or moving inverted data to one or more other physical memory locations. In doing so, inversion refresh of physical memory locations that store valid data, that store invalid data, that are marked defective, and that are available/free for storage of data are accounted for. Depending on the embodiment, the inversion refresh techniques described herein can be implemented by a memory sub-system controller, a media controller of a memory device of a memory sub-system, or some combination thereof.

According to some embodiments, based on the state of a first set of physical memory locations (e.g., a first page of a first block) indicating that the first set of physical memory locations are currently storing valid data, inversion refresh of the first set of physical memory locations can comprise: reading the current (valid) data from the first set of physical memory locations; generating inverted data based on the current data (e.g., by inverting the current data); writing (e.g., programming) the inverted data to a second set of physical memory locations (e.g., a second page of a second block); and updating an inversion flag associated with a second set of physical memory locations (if not already updated) to indicate the inversion status of the inverted data written to the second set of physical memory locations (e.g., the inverted data stored on the second set of physical memory locations represents an inverted or a non-inverted version of the valid data). By these operations, valid data can be effectively moved from the first set of physical memory locations (e.g., of a first block) to the second set of physical memory locations (e.g., of a second block).

Additionally, performing inversion refresh can comprise updating tracking data to update the time since the second set of physical memory locations was last inversion refreshed (e.g., last time the page or block that includes the second set of physical memory locations was inversion refreshed); such tracking data can later be used by various embodiments in selecting physical memory locations (e.g., pages or blocks) as candidates (e.g., victims) for inversion refresh. The inversion flag of the second set of physical memory locations can be updated based on the inversion flag of the first set of physical memory locations (e.g., value of the inversion flag of the second set of physical memory locations can be equal to the inverted value of the inversion flag of the first set of physical memory locations). By writing the inverted data to the second set of physical memory locations, various embodiments can effectively move valid data from the first set of physical memory locations (e.g., of a first block) to the second physical memory locations (e.g., of a second block). Moving of data from the first set of physical memory locations (e.g., of an old block of a NAND-type memory device) to the second set of physical memory locations (e.g., of a new block of the NAND-type memory) can be similar to, or be part of, one or more move operations performed by a garbage collection process that is being performed on the first set of physical memory locations (e.g., being performed on the old block).

Based on the state of a first set of physical memory locations (e.g., a first page of a first block) indicating that the first set of physical memory locations are currently storing invalid data (e.g., previously valid data now marked invalid), inversion refresh of the first set of physical memory locations can comprise: reading the current (invalid) data from the first set of physical memory locations; generating inverted data based on the current data (e.g., by inverting the current data); and writing (e.g., programming) the inverted data back to a second set of physical memory locations. In doing so, invalid data can be effectively moved from the first set of physical memory locations (e.g., of a first block) to the second set of physical memory locations (e.g., of a second block). Additionally, performing inversion refresh can comprise updating tracking data to update the time since the second set of physical memory locations was last inversion refreshed (e.g., last time the page or block that includes the first set of physical memory locations was inversion refreshed). As described herein, such tracking data can later be used by various embodiments in selecting physical memory locations (e.g., pages or blocks) as candidates (e.g., victims) for inversion refresh.

Based on the state of a first set of physical memory locations (e.g., a first page of a first block) indicating that the first set of physical memory locations are defective or available/free for use (e.g., not defective, but not currently storing valid or previously valid data), inversion refresh of the first set of physical memory locations can comprise: reading a value of an inversion flag associated with the first set of physical memory locations (e.g., inversion flag of page or block that includes the first set of physical memory locations); writing a portion of a pre-determined data pattern to the first set of physical memory locations based on the value from the inversion flag (e.g., writing an inverted or non-inverted version of the portion to the first set of physical memory locations based on the value); and updating the inversion flag associated with the first set of physical memory locations (if not already updated) to invert (e.g., flip) the value of the inversion flag. Additionally, performing inversion refresh can comprise updating tracking data to update the time since the second set of physical memory locations was last inversion refreshed (e.g., last time the page or block that includes the first set of physical memory locations was inversion refreshed). As described herein, such tracking data can later be used by various embodiments in selecting physical memory locations (e.g., pages or blocks) as candidates (e.g., victims) for inversion refresh.

Depending on the embodiment, identification or selection of a set of physical memory locations (e.g., a block or a page) for inversion refresh can be based on satisfaction of one or more conditions by the set of physical memory locations. According to some embodiments, a condition involving a time since last inversion refresh is used to select a set of physical memory locations for inversion refresh. For instance, where the time since last inversion refresh for a given set of physical memory locations is more than a threshold inversion refresh time (e.g., 2 hours), the given set of physical memory locations can be selected for inversion refresh as described herein. The threshold inversion refresh time can vary between different embodiments and different memory devices (e.g., memory device A has a "invert every X hours" reliability characteristic, while memory device B has a "invert every Y hours" reliability characteristic). As described herein, a time since last inversion refresh for a set of physical memory locations (e.g., a page or a block) can be stored in tracking data that is maintained by various embodiments (e.g., maintained by a memory sub-system controller of an embodiment). Depending on the embodiment, operations of determining whether one or more physical memory locations of a memory device satisfy one or more conditions (e.g., time since last inversion refresh) for inversion refresh and selecting one or more physical memory locations accordingly can be invoked based on expiration of an inversion refresh timer, which can be used to ensure that inversion refresh checking for the one or more physical memory locations is run periodically (e.g., inversion refresh timer is set such that an inversion rate for a memory device is achieved for data storage reliability).

Some embodiments are implemented as part of (e.g., incorporated into) a garbage collection process performed on one or more physical memory locations (e.g., memory cells) of a non-volatile memory device, such as a NAND-type memory device. For instance, one or more inversion refresh strategies described herein can be performed on one or more physical memory locations (e.g., memory cells or pages) of a block as part of performing garbage collection on the block. For example, a block can be selected for garbage collection (e.g., garbage collection victim block selection) using one or more garbage collection parameters, which can include one or more traditional garbage collection parameters (e.g., garbage collection optimization parameters, such as data invalidity) and can include at least one (new) parameter relating to time since last inversion refresh as described herein. As garbage collection is performed on a selected block, inversion refresh can be performed on individual pages of the selected block based on the respective states of those individual pages (e.g., valid, invalid, defective, or available/free), where the inversion refresh of those individual pages can indirectly facilitate part of a garbage collection operation being performed on those individual pages (e.g., moving valid data from the individual pages of the selected (old) block to a pages of a new block).

Use of various embodiments described herein can ensure inversion refresh is performed on a memory device, and at a sufficient inversion refresh rate, to ensure reliable operation of the memory device. By implementing various embodiments as part of a garbage collection process, inversion refresh strategies described herein can be implemented into a memory sub-system with low complexity (e.g., using existing infrastructure of garbage collection) while improving performance of the memory sub-system. Additionally, implementing various embodiments as part of a garbage collection process can reduce data storage usage on a memory sub-system.

As used herein, a physical memory location can comprise a memory cell of a memory device (e.g., NAND-type memory device), and two or more physical memory locations can form part of a block of the memory device or form part of a page of the block (e.g., the block comprising a plurality of pages). As used herein, a set of physical memory locations can refer to a sequence of physical memory locations, which can store a sequence of data (e.g., a sequence of data bits). A set of physical memory locations can be associated with a logical block address (LBA), which can map to a block address and a page address corresponding to the set of physical memory locations. As also used herein, an inversion flag associated with a given set of physical memory locations can comprise an inversion flag of a page (e.g., page-level inversion flag) that includes the given set of physical memory locations, or an inversion flag of a block (e.g., block-level inversion flag) that includes the given set of physical memory locations. For a given inversion flag, a value of true or 1 can indicate that inversion is present, and a value of false or 0 can indicate that inversion is not present. Depending on the embodiment, the inversion flag of the given set of physical memory locations can be stored with the given set of physical memory locations (e.g., in metadata), or can be stored separate from the given set of physical memory locations (e.g., in tracking data maintained by the memory sub-system controller).

Disclosed herein are some examples of performing inversion refresh of a physical memory location of a memory device based on a state of the physical memory location, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a SATA interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, SLCs, can store one bit per cell. Other types of memory cells, such as multi-level cells (MLCs), TLCs, quad-level cells (QLCs), and penta-level cells (PLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or an QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes an inversion refresh operator 113 that enables or facilitates performing inversion refresh of a physical memory location of one of the memory devices 130, 140 (e.g., memory cell of one of the memory devices 130, 140) based on a state of the physical memory location. For example, based on the inversion refresh operator 113, the memory sub-system controller 115 can select a first set of physical memory locations of the memory device 140 based on the first set of physical memory locations satisfying an inversion refresh condition, determine a state of the first set of physical memory locations, and perform an inversion refresh on the first set of physical memory locations based on the state of the first set of physical memory locations. Depending on the embodiment, the first set of physical memory locations can comprise a set of memory cells that form part of a block of the memory device 140 or, more specifically, a page of the block of the memory device 140.

For some embodiments, the inversion refresh condition comprises a time since last inversion refresh of the first set of physical memory locations. For instance, the inversion refresh condition can be satisfied if the time since last inversion refresh surpasses an inversion refresh threshold defined by an amount of time (e.g., time value that ensures an inversion refresh rate that achieves reliability for the memory device 140). The inversion refresh threshold can differ for different memory devices (e.g., based on memory device type and other characteristics). For some embodiments, selecting the first set of physical memory locations of the memory device 140 based on the first set of physical memory locations satisfying the inversion refresh condition comprises selecting a first block of the memory device based on the first block satisfying the inversion refresh condition, where the first block comprises the first set of physical memory locations. The inversion refresh condition can comprise, for instance, a time since last inversion refresh of the first block.

The memory sub-system controller 115 can comprise an inversion refresh timer, where upon expiration of the inversion refresh timer, the memory sub-system controller 115 invokes the search and selection of one or more physical memory locations (e.g., search and selection of a block) of the memory device 140 based on at least one inversion refresh condition (e.g., time since last inversion refresh) and performs inversion refresh on the selected physical memory locations based on the state of the selected physical memory locations. Where inversion refresh is implemented as part of a garbage collection process (as described herein), use of an inversion refresh timer can ensure that various embodiments can select and perform inversion refresh of one or more physical memory locations of the memory device 140 outside of the garbage collection process in the event that the garbage collection process fails to be performed on the one or more physical memory locations within a desired amount of time.

For some embodiments, in response to determining that the state of the first set of physical memory locations indicates that the first set of physical memory locations is storing valid data, the memory sub-system controller 115 performs inversion refresh of a first set of physical memory locations based on a state of the first set of physical memory locations by: reading the valid data (valid data currently stored) from the first set of physical memory locations; generating inverted data based on the valid data (e.g., by inverting the valid data read from the first set of physical memory locations); writing the inverted data to a second set of physical memory locations (e.g., programming the second set of physical memory locations with the inverted data); and updating an inversion flag associated with the second set of physical memory locations. Additionally, the memory sub-system controller 115 can update a time since last inversion refresh of the second set of physical memory locations (which can be stored in tracking data maintained by the memory sub-system controller 115); the updated time can be used in selecting the second set of physical memory locations for inversion refresh in the future. The first set of physical memory locations can form (or form a part of) a first page of a first block of the memory device 140, and the second set of physical memory locations can form (or form a part of) a second page of a second block of the memory device 140. Updating the inversion flag associated with the second set of physical memory locations can comprise reading a first value (e.g., true or false) of an inversion flag associated with the first set of physical memory locations, and updating the inversion flag associated with the second set of physical memory locations to a second value, where the second value is based on the first value. For instance, in response to the first value of the inversion flag associated with the first set of physical memory locations being true, the second value (of the inversion flag associated with the second set of physical memory locations) can be set to a value of false, and the second value can be set to a value of true in response to the first value being false. For some embodiments, the inversion flag associated with the second set of physical memory locations is updated only if it has not already been updated by an earlier operation. For instance, the first set of physical memory locations is part of a first block of the memory device 140, the second set of physical memory locations is part of a second block of the memory device 140, and the inversion flag associated with the second set of physical memory locations can comprise the inversion flag of the second block; the inversion flag of the second block may have already been updated once by a prior write (e.g., move) of valid data from the first block to the second block.

For some embodiments, in response to determining that the state of the first set of physical memory locations indicates that the first set of physical memory locations is storing invalid data, the memory sub-system controller 115 performs inversion refresh of a first set of physical memory locations based on a state of the first set of physical memory locations by: reading the invalid data (invalid data currently stored) from the first set of physical memory locations; generating inverted data based on the invalid data (e.g., by inverting the invalid data read from the first set of physical memory locations); and writing the inverted data to a second set of physical memory locations (e.g., programming the second set of physical memory locations with the inverted data). Additionally, the memory sub-system controller 115 can update a time since last inversion refresh of the second set of physical memory locations (which can be stored in tracking data maintained by the memory sub-system controller 115); the updated time can be used in selecting the second set of physical memory locations for inversion refresh in the future. As described herein, the first set of physical memory locations can form (or form a part of) a first page of a first block of the memory device 140, and the second set of physical memory locations can form (or form a part of) a second page of a second block of the memory device 140.

For some embodiments, in response to determining that the state of the first set of physical memory locations indicates that the first set of physical memory locations is either defective or available/free to store data, the memory sub-system controller 115 performs inversion refresh of a first set of physical memory locations based on a state of the first set of physical memory locations by: reading a first value of an inversion flag associated with the first set of physical memory locations; writing at least one portion of a pre-determined data pattern to the first set of physical memory locations based on the first value (e.g., programming the first set of physical memory locations with the at least one portion); and updating the inversion flag associated with the first set of physical memory locations to a second value, where the second value is based on the first value. Additionally, the memory sub-system controller 115 can update a time since last inversion refresh of the first set of physical memory locations (which can be stored in tracking data maintained by the memory sub-system controller 115); the updated time can be used in selecting the first set of physical memory locations for inversion refresh in the future. The first set of physical memory locations can form (or form a part of) a first page of a first block of the memory device 140. Updating the inversion flag associated with the first set of physical memory locations to the second value can comprise: in response to the first value of the inversion flag associated with the first set of physical memory locations being true, the second value can be set to a value of false, and the second value can be set to a value of true in response to the first value being false. For some embodiments, the inversion flag associated with the first set of physical memory locations is updated only if it has not already been updated by an earlier operation. For instance, the first set of physical memory locations is part of a first block of the memory device 140, and the inversion flag associated with the first set of physical memory locations can comprise the inversion flag of the first block; the inversion flag of the first block may have already been updated once by a prior write of inverted data to the first block.

The pre-determined data pattern used can vary between different embodiments. For example, the pre-determined data pattern can comprise a user-defined data pattern, a manufacturer-set data pattern, or a well-known data pattern.

For some embodiments, the pre-determined can comprise a pattern where 50% of the bits are set to 1 and 50% of the bits are set to 0. The pre-determined data pattern can have a data size corresponding to the size of a set of physical memory locations (e.g., cells), such as a page of a block of the memory device 140. For some embodiments, the memory sub-system controller 115 writes at least one portion of the pre-determined data pattern to the first set of physical memory locations based on the inversion flag by: determining whether the inversion flag is true or false; in response to determining that the inversion flag is true, writing at least one portion of a non-inverted version of the pre-determined data pattern to the first set of physical memory locations; and in response to determining that the inversion flag is false, writing at least one portion of an inverted version of the pre-determined data pattern to the first set of physical memory locations.

Operations performed on the memory device 140 by the memory sub-system controller 115 can be performed as part of a garbage collection process (or another background/maintenance operation that causes data to be moved from one block to another) that is being performed by the memory sub-system controller 115 on the memory device 140. For instance, the selection of a block of the memory device 140 for inversion refresh can be part of the victim block selection performed by a garbage collection process, which can based on one or more garbage collection parameters and can further be based on one or more new parameters, such as time since last inversion refresh of the block.

Depending on the embodiment, the state of the first set of physical memory locations can indicate, for example, that: the first set of physical memory locations is storing valid data; the first set of physical memory locations is storing invalid data (e.g., previously valid data now marked invalid); the first set of physical memory locations is defective; or the first set of physical memory locations is free (e.g., available) to store data.

For some embodiments, when the host system 120 requests a read of valid data from a given set of physical memory locations (e.g., one or more pages of a block) of the memory device 140, the memory sub-system controller 115 reads a value of an inversion flag of the given set of physical memory locations, reads the valid data from the given set of physical memory locations, and provides the valid data to the host system 120 based on the value of the inversion flag. Where the inversion flag indicates that the valid data is in an inverted state, the memory sub-system controller 115 can remove the inversion of the valid data (by re-inverting the valid data), and can provide the resulting, non-inverted valid data to the host system 120. Where the inversion flag indicates that the valid data is in a non-inverted state, the memory sub-system controller 115 can provide the valid data to the host system 120 as-is.

Figure 2:
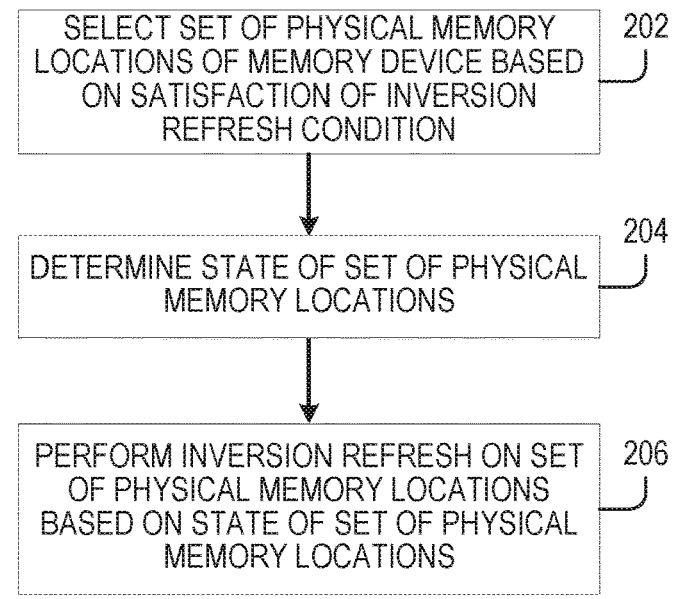
FIGS. 2 through 4 are flow diagrams of example methods for inversion refresh of a physical memory location of a memory device, in accordance with some embodiments of the present disclosure.
Figure 3:
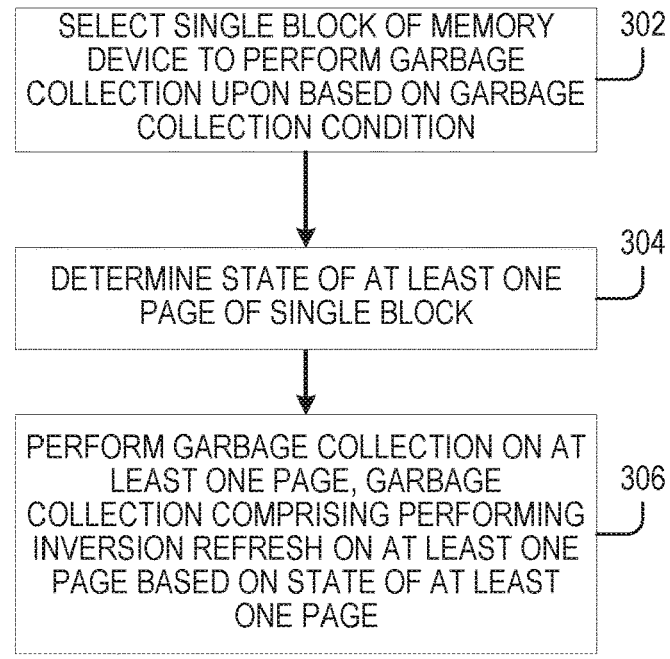
Figure 4:
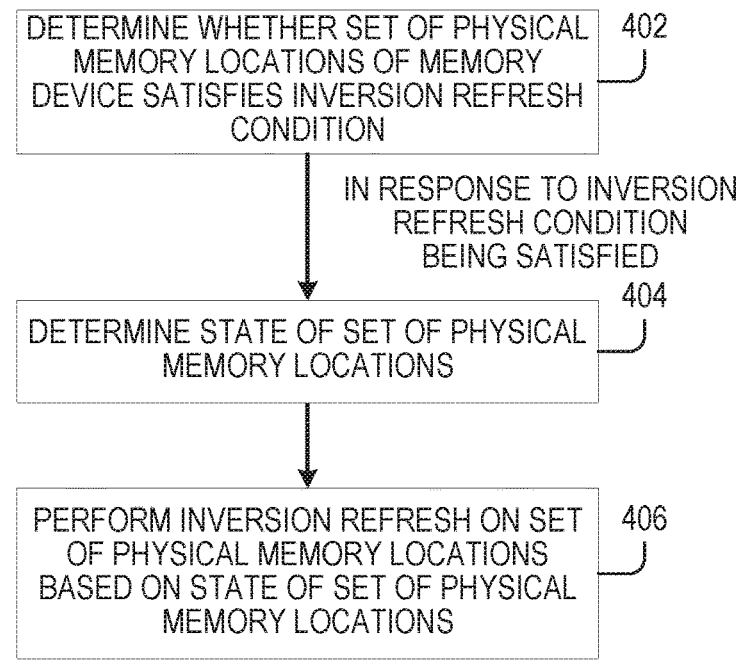

FIGS. 2 through 4 are flow diagrams of example methods for inversion refresh of a physical memory location of a memory device, in accordance with some embodiments of the present disclosure. The methods 200, 300, 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, at least one of the methods 200, 300, 400 is performed by the memory sub-system controller 115 of FIG. 1 based on the inversion refresh operator 113. Additionally, or alternatively, for some embodiments, at least one of the methods 200, 300, 400 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Referring now to the method 200 of FIG. 2, for some embodiments, the method 200 is invoked upon expiration of an inversion refresh timer (e.g., of the memory sub-system controller 115) as described herein. Additionally, the method 200 can be implemented as part of a garbage collection process being performed on a memory device (e.g., 140). At operation 202, a processing device (e.g., the processor 117 of the memory sub-system controller 115) selects a first set of physical memory locations of a memory device (e.g., 140) based on the first set of physical memory locations satisfying an inversion refresh condition. The inversion refresh condition can comprise a time since last inversion refresh of the first set of physical memory locations. Where the memory device (e.g., 140) comprises a plurality of blocks (e.g., each block comprising a plurality of pages), operation 202 can comprise selecting a first block of the memory device based on the first block satisfying the inversion refresh condition (e.g., time since last inversion refresh of the first block surpasses an inversion refresh threshold), where the first block comprises the first set of physical memory locations (e.g., a first page). Where the operations of the method 200 are performed as part of performing garbage collection on the memory device, the inversion refresh condition can comprise a garbage collection parameter (e.g., one used to select a victim block).

At operation 204, the processing device determines a state of the first set of physical memory locations (e.g., storing valid data, storing invalid data, defective, or available for use). The state of the first set of physical memory locations can indicate at least one of: the first set of physical memory locations is storing valid data; the first set of physical memory locations is storing invalid data; the first set of physical memory locations is defective; or the first set of physical memory locations is free to store data.

At operation 206, the processing device performs inversion refresh on the first set of physical memory locations based on the state of the first set of physical memory locations (determined by operation 204). In response to operation 204 determining that the state of the first set of physical memory locations indicates that the first set of physical memory locations is storing valid data, the processing device can: read the valid data from the first set of physical memory locations; generate inverted data based on the valid data; write the inverted data to a second set of physical memory locations (e.g., second page of a second block of the memory device 140); and update an inversion flag associated with the second set of physical memory locations (e.g., inversion flag of the second block). For some embodiments, updating the inversion flag associated with the second set of physical memory locations comprises: reading a first value of an inversion flag associated with the first set of physical memory locations; and updating the inversion flag associated with the second set of physical memory locations to a second value, where the second value is based on the first value.

In response to operation 204 determining that the state of the first set of physical memory locations indicates that the first set of physical memory locations is storing invalid data, the processing device can: read the invalid data from the first set of physical memory locations; generate inverted data based on the invalid data; and write the inverted data to a second set of physical memory locations.

In response to operation 204 determining that the state of the first set of physical memory locations indicates that the first set of physical memory locations is either defective or available to store data, the processing device can: read a first value of an inversion flag associated with the first set of physical memory locations; generate inverted data based on the valid data; write at least one portion of a pre-determined data pattern to the first set of physical memory locations based on the first value; and update the inversion flag associated with the first set of physical memory locations to a second value, the second value being based on the first value. For some embodiments, the processing device writes at least one portion of the pre-determined data pattern to the first set of physical memory locations based on the inversion flag by: determining whether the inversion flag is true or false; in response to determining that the inversion flag is false, writing at least one portion of an inverted version of the pre-determined data pattern to the first set of physical memory locations; and in response to determining that the inversion flag is true, writing at least one portion of a non-inverted version of the pre-determined data pattern to the first set of physical memory locations.

Referring now to the method 300 of FIG. 3, for some embodiments, the method 300 is invoked upon expiration of an inversion refresh timer (e.g., of the memory sub-system controller 115) as described herein. Additionally, the method 300 can be implemented as part of a garbage collection process being performed on a memory device (e.g., 140). At operation 302, a processing device (e.g., the processor 117 of the memory sub-system controller 115) selects, from a plurality of blocks of a memory device (e.g., 140), a single block to perform garbage collection upon based on a garbage collection condition (e.g., garbage collection parameter).

At operation 304, the processing device determines a state of at least one page of the single block (e.g., storing valid data, storing invalid data, defective, or available for use). As shown at operation 306, the processing device performs garbage collection on the at least one page by performing inversion refresh on the at least one page based on the state of the at least one page determined by operation 304.

For some embodiments, in response to determining that the state of the at least one page indicates the at least one page is storing valid data, the processing device: reads the valid data from the at least one page; generates inverted data based on the valid data (e.g., by inverting the valid data read from the at least one page); writes the inverted data to a new page of another block of the memory device (e.g., programming the new page with the inverted data); and updates an inversion flag associated with the other block. Additionally, the processing device can update a time since last inversion refresh of the other block (which can be stored in tracking data maintained by the memory sub-system controller 115); the updated time can be used in selecting the other block for inversion refresh in the future. Updating the inversion flag associated with the other block can comprise the processing device reading a first value (e.g., true or false) of an inversion flag associated with the single block, and updating the inversion flag associated with the other block to a second value, where the second value is based on the first value. For instance, in response to the first value of the inversion flag associated with the single block being true, the second value (of the inversion flag associated with the other block) can be set to a value of false, and the second value can be set to a value of true in response to the first value being false.

For some embodiments, in response to determining that the state of the at least one page indicates the at least one page is storing invalid data, the processing device: reads the invalid data from the at least one page; generates inverted data based on the invalid data (e.g., by inverting the invalid data read from the at least one page); and writes the inverted data to a new page of another block of the memory device (e.g., programming the new page with the inverted data). Additionally, the processing device can update a time since last inversion refresh of the other block (which can be stored in tracking data maintained by the memory sub-system controller 115); the updated time can be used in selecting the other block for inversion refresh in the future.

For some embodiments, in response to determining that the state of the at least one page indicates the at least one page is either defective or available to store data, the processing device: reads a first value of an inversion flag associated with the single block; writes at least one portion of a pre-determined data pattern to the at least one page based on the inversion flag (e.g., programming the new page with the at least one portion); and updates the inversion flag associated with the single block to a second value, where the second value is based on the first value. Additionally, the processing device can update a time since last inversion refresh of the single block (which can be stored in tracking data maintained by the memory sub-system controller 115); the updated time can be used in selecting the single block for inversion refresh in the future. To update the inversion flag associated with the single block to the second value, the processing device can set the second value to a value of false in response to the first value of the inversion flag associated with the single block being true, and the processing device can set the second value to a value of true in response to the first value being false. In writing at least one portion of the pre-determined data pattern to the at least one page based on the inversion flag, the processing device can: determine whether the inversion flag is true or false; in response to determining that the inversion flag is false, write at least one portion of an inverted version of the pre-determined data pattern to the at least one page; and in response to determining that the inversion flag is true, write at least one portion of a non-inverted version of the pre-determined data pattern to the at least one page.

Referring now to the method 400 of FIG. 4, for some embodiments, the method 400 is invoked upon expiration of an inversion refresh timer (e.g., of the memory sub-system controller 115) as described herein. Additionally, the method 400 can be implemented as part of a garbage collection process being performed on a memory device (e.g., 140). At operation 402, a processing device (e.g., the processor 117 of the memory sub-system controller 115) determines whether a first set of physical memory locations of a memory device satisfies an inversion refresh condition. Depending on the embodiment, the inversion refresh condition can comprise at least one of a garbage collection parameter or a time since the first set of physical memory locations was last inversion refreshed.

In response to determining that the first set of physical memory locations satisfies the inversion refresh condition, at operation 404, the processing device determines a state of the first set of physical memory locations (e.g., storing valid data, storing invalid data, defective, or available for use). At operation 406, the processing device performs inversion refresh on the first set of physical memory locations based on the state of the first set of physical memory locations.

Figure 5A:
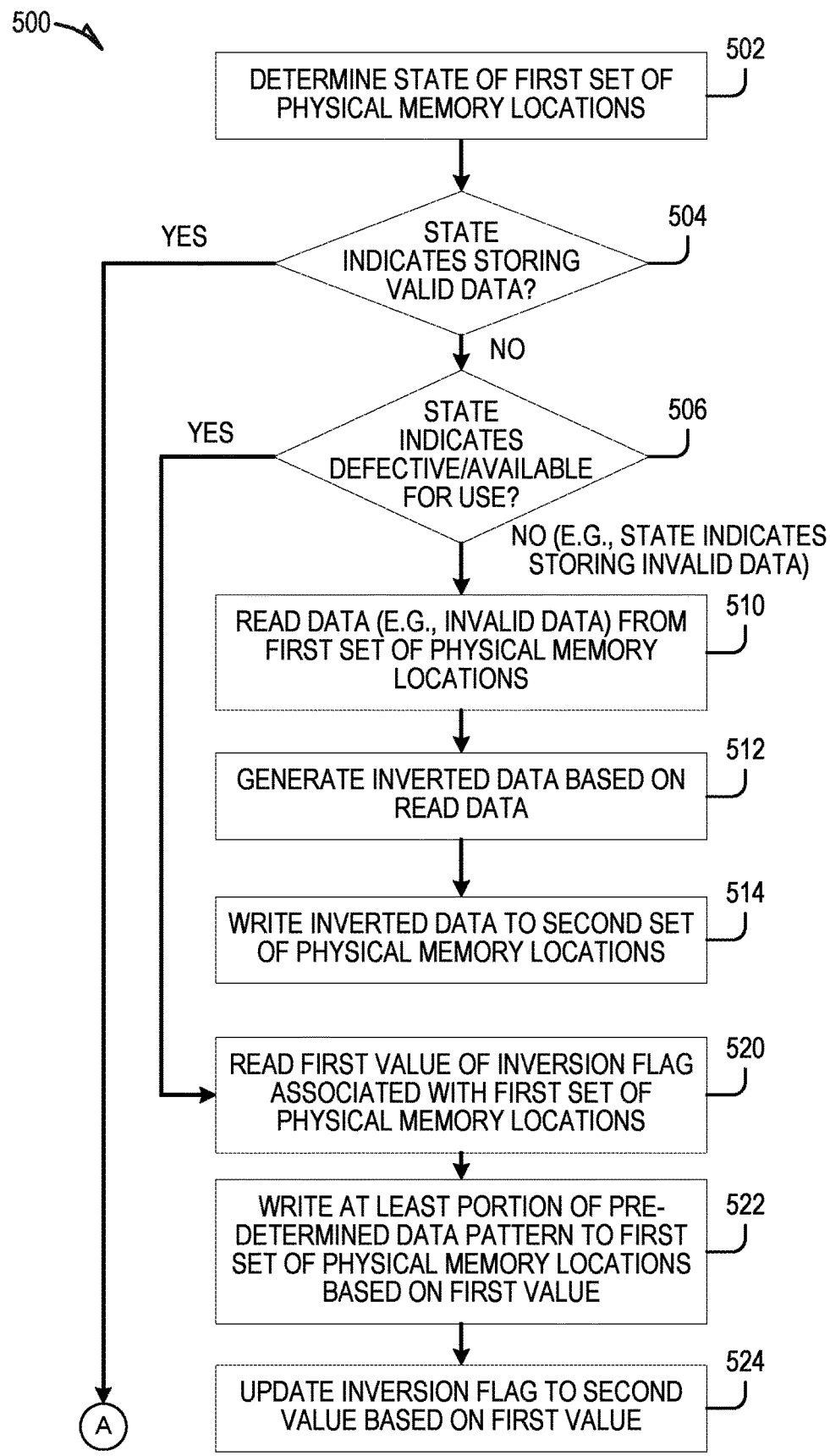
FIGS. 5A and 5B present a flow diagram of an example method for inversion refresh of a physical memory location of a memory device, in accordance with some embodiments of the present disclosure.
Figure 5B:
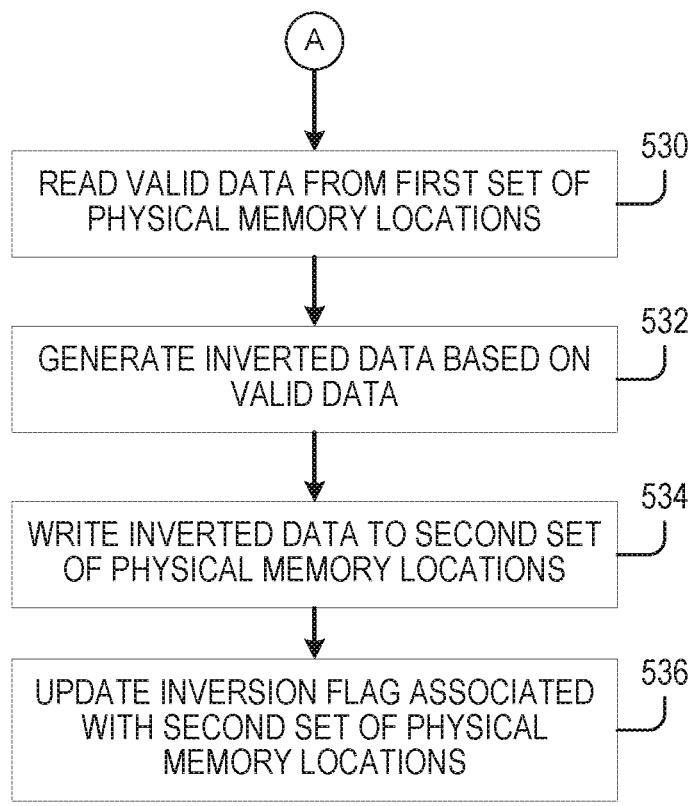

FIGS. 5A and 5B present a flow diagram of an example method 500 for inversion refresh of a physical memory location of a memory device, in accordance with some embodiments of the present disclosure. In particular, the method 500 illustrates an example of how inversion refresh is performed on a set of physical memory locations of a memory device (e.g., 140) based on a specific state of a set of physical memory locations. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the memory sub-system controller 115 of FIG. 1 based on the inversion refresh operator 113. Additionally, or alternatively, for some embodiments, the method 500 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

As shown at operation 502, a processing device (e.g., the processor 117 of the memory sub-system controller 115) determines a state of a first set of physical memory locations of a memory device (e.g., 140). At operation 504, the processing device determines whether the state indicates that the first set of physical memory locations is storing valid data. In response to the state indicating that the first set of physical memory locations is storing valid data, the method 500 proceeds to operation 530, otherwise the method 500 proceeds to operation 506. The processing device determines, at operation 506, whether the state indicates that the first set of physical memory locations is either defective or available for use. In response to the state indicating that the first set of physical memory locations is either defective or available for use, the method 500 proceeds to operation 520, otherwise the method 500 proceeds to operation 510. For some embodiments, the method 500 proceeds to operation 510 in response to the state indicating that the first set of physical memory locations is storing invalid data.

With respect to operation 510, the processing device reads data (e.g., invalid data) from the first set of physical memory locations of the memory device. At operation 512, the processing device generates inverted data based on the data (e.g., invalid data) read from the first set of physical memory locations by operation 510. The processing device writes the inverted data to a second set of physical memory locations at operation 514.

With respect to operation 520, the processing device reads a first value of an inversion flag associated with the first set of physical memory locations. At operation 522, the processing device writes at least one portion of a pre-determined data pattern to the first set of physical memory locations based on the first value read by operation 520. Based on the first value read by operation 520, the processing device updates an inversion flag associated with the second set of physical memory locations at operation 524.

With respect to operation 530, the processing device reads valid data from the first set of physical memory locations of the memory device. At operation 532, the processing device generates inverted data based on the valid data read from the first set of physical memory locations by operation 530. The processing device writes the inverted data to a second set of physical memory locations at operation 534, and updates an inversion flag associated with the second set of physical memory locations at operation 536.

Figure 6A:
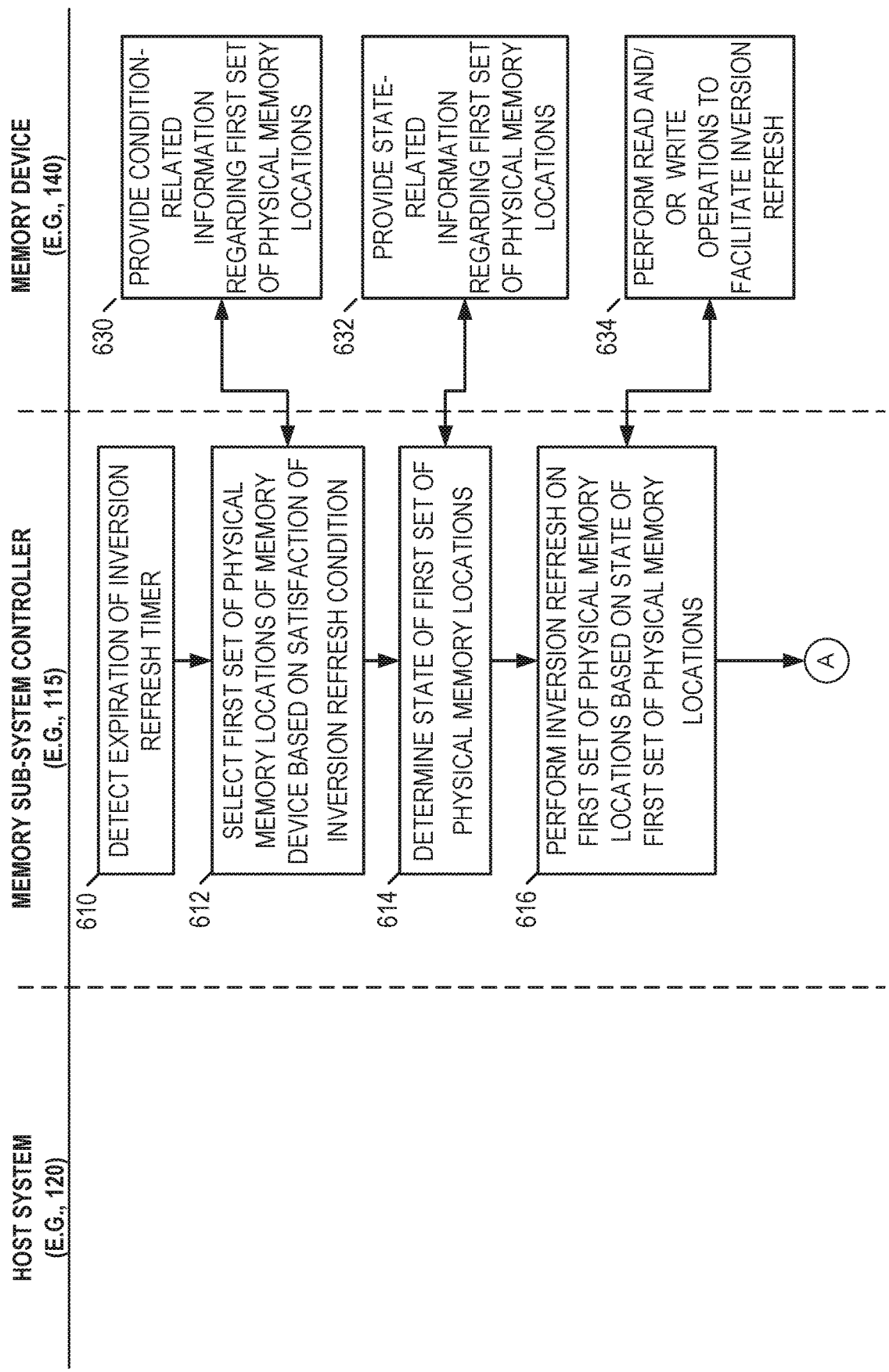
FIGS. 6A and 6B provide an interaction diagram illustrating interactions between components of a computing environment in the context of some embodiments in which a method for inversion refresh of a physical memory location of a memory device as described herein is performed.
Figure 6B:
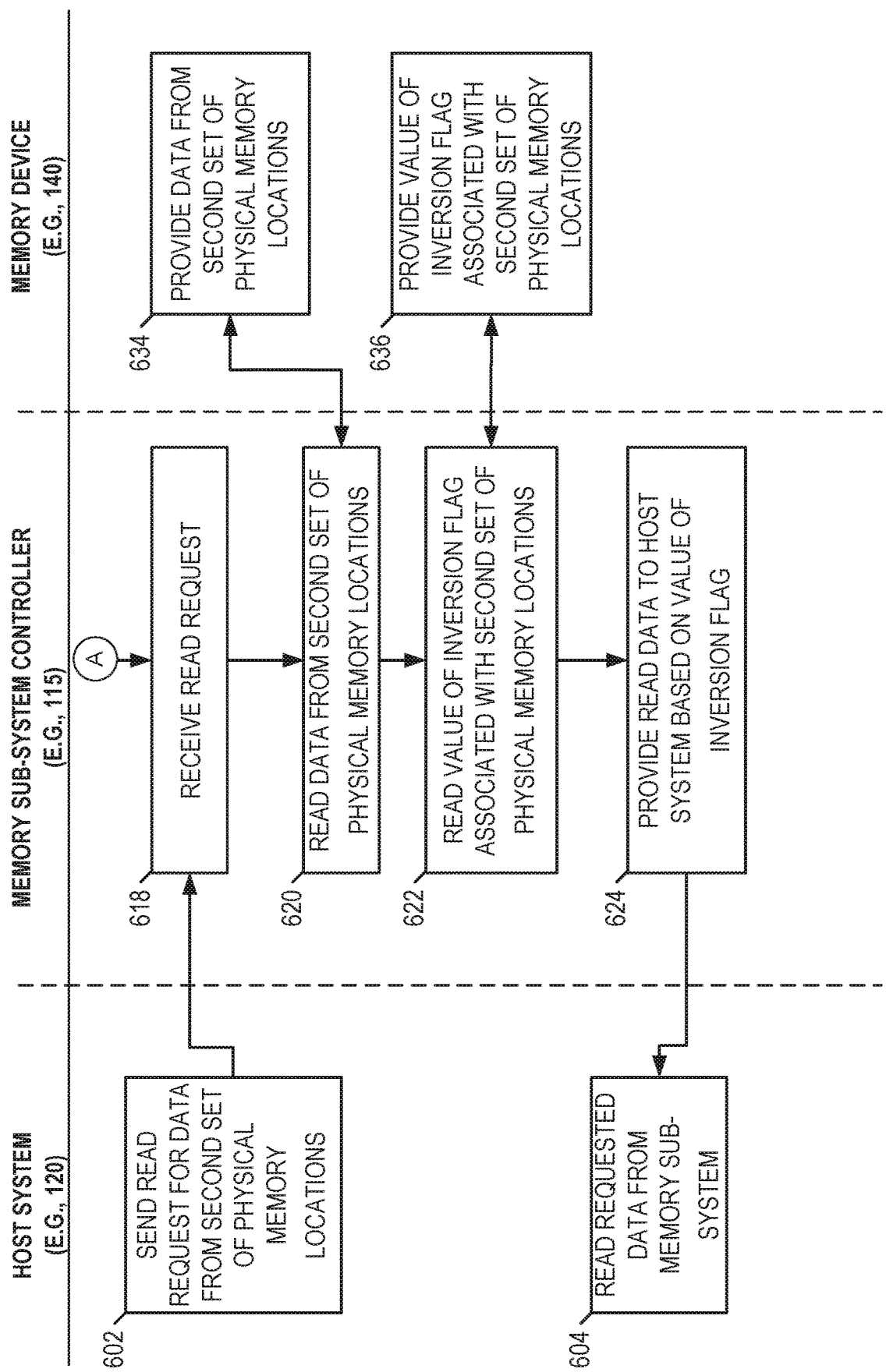

FIGS. 6A and 6B provide an interaction diagram illustrating interactions between components of a computing environment in the context of some embodiments in which a method for inversion refresh of a physical memory location of a memory device as described herein is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a memory device (e.g., 130 or 140), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. In the context of the example illustrated in FIGS. 6A and 6B, the host system can include the host system 120, the memory sub-system controller can include the memory sub-system controller 115, and the memory device can include the memory device 140.

As shown in FIG. 6A, at operation 610, the memory sub-system controller 115 detects expiration of an inversion refresh timer of the memory sub-system controller 115. At operation 612, the memory sub-system controller 115 selects a set of physical memory locations of the memory device 140 based on satisfaction of an inversion refresh condition. At operation 630, the memory device 140 provides condition-related information regarding the set of physical memory locations, which can facilitate evaluation of the inversion refresh condition for the set of physical memory locations by the memory sub-system controller 115 at operation 612. For example, the memory device 140 can provide a time since the set of physical memory locations was last refreshed.

At operation 614, the memory sub-system controller 115 determines a state of the set of physical memory locations. At operation 632, the memory device 140 provides state-related information regarding the set of physical memory locations, which can enable the memory sub-system controller 115 to determine the state of the set of physical memory locations (e.g., storing valid data, storing invalid data, defective, or available for use) at operation 614. For example, the memory device 140 can provide the state-related information from metadata stored (by the memory device 140) for the set of physical memory locations.

At operation 616, the memory sub-system controller 115 performs inversion refresh on the set of physical memory locations based on the state of the set of physical memory locations. At operation 634, based on commands sent from the memory sub-system controller 115 to the memory device 140, the memory device 140 performs one or more reads or writes with respect to the set of physical memory locations to facilitate inversion refresh of the set of physical memory locations based on the state of the set of physical memory locations.

At operation 602, the host system 120 sends a read request to the memory sub-system 110 for data from a second set of physical memory locations of the memory device 140. At operation 618, the memory sub-system controller 115 receives the read request from the host system 120. In response to the read request from the host system 120, at operation 620, the memory sub-system controller 115 reads the requested data from the second set of physical memory locations. At operation 634, the memory device 140 provides the memory sub-system controller 115 with the requested data from the second set of physical memory locations.

At operation 622, the memory sub-system controller 115 reads a value of an inversion flag associated with the second set of physical memory locations. At operation 636, the memory device 140 provides the memory sub-system controller 115 with the value of the inversion flag associated with the second set of physical memory locations.

At operation 624, the memory sub-system controller 115 provides the data (read from the second set of physical memory locations) to the host system 120 based on the value of the inversion flag associated with the second set of physical memory locations. For instance, if the value of the inversion flag indicates that the data read from the second set of physical memory locations is inverted (e.g., value is equal to true), the memory sub-system controller 115 can invert the data prior to providing the data to the host system 120. If, however, the value of the inversion flag indicates that the data read from the second set of physical memory locations is not inverted (e.g., value is equal to false), the memory sub-system controller 115 can provide the data to the host system 120 as-is. At operation 604, the host system 120 can receive the requested data from the memory sub-system 110.

Figure 7:
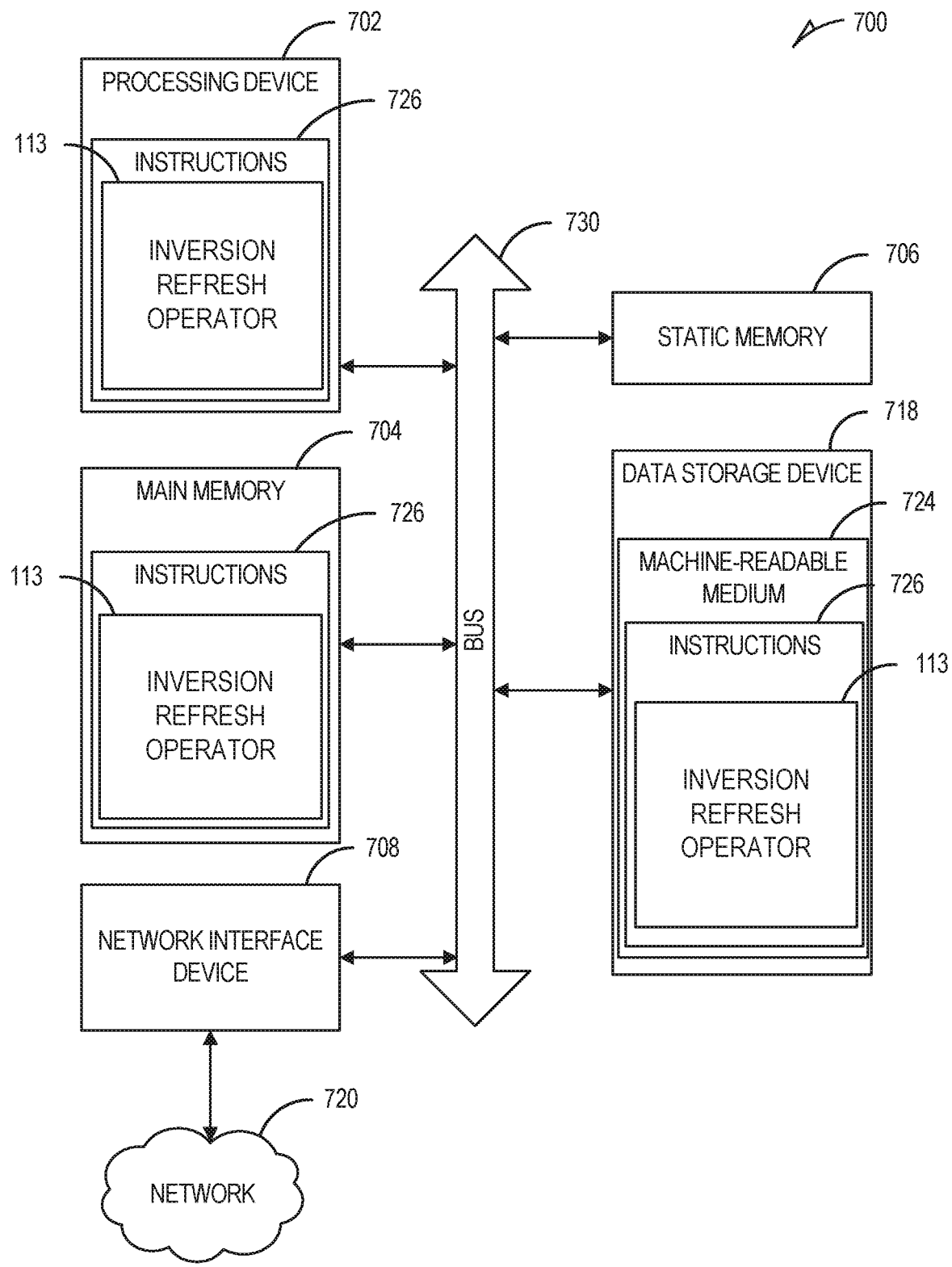
FIG. 7 is a block diagram of an example computer system in which embodiments of the present disclosure may operate.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage device 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage device 718, and/or main memory 704 can correspond to the memory sub-system 110 of FIG. 1.

In one embodiment, the instructions 726 include instructions to implement functionality corresponding to performing inversion refresh of a physical memory location of a memory device as described herein (e.g., the inversion refresh operator 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:
1. A system comprising:
a memory device; and
a processing device, operatively coupled to the memory device, configured to perform operations comprising:

selecting a first set of physical memory locations of the memory device based on the first set of physical memory locations satisfying an inversion refresh condition;

determining a state of the first set of physical memory locations; and based on the state of the first set of physical memory locations, performing inversion refresh on the first set of physical memory locations by:

determining whether an inversion flag associated with the first set of physical memory locations is true or false;

in response to determining that the inversion flag associated with the first set of physical memory locations is false, writing at least one portion of an inverted version of a pre-determined data pattern to the first set of physical memory locations;

in response to determining that the inversion flag associated with the first set of physical memory locations is true, writing at least one portion of a non-inverted version of the pre- determined data pattern to the first set of physical memory locations; and updating the inversion flag associated with the first set of physical memory locations based on a current value of the inversion flag associated with the first set of physical memory locations.

2. The system of claim 1, wherein the inversion refresh condition comprises a time since last inversion refresh of the first set of physical memory locations.

3. The system of claim 2, wherein the performing of the inversion refresh on the first set of physical memory locations comprises:

updating the time since last inversion refresh of the first set of physical memory locations based on the state of the first set of physical memory locations.

4. The system of claim 1, wherein the selecting of the first set of physical memory locations of the memory device based on the first set of physical memory locations satisfying the inversion refresh condition comprises:

selecting a first block of the memory device based on the first block satisfying the inversion refresh condition, the first block comprising the first set of physical memory locations.

5. The system of claim 4, wherein the inversion refresh condition comprises a time since last inversion refresh of the first block.

6. The system of claim 1, wherein the state of the first set of physical memory locations indicates at least one of:
the first set of physical memory locations is storing valid data;
the first set of physical memory locations is storing invalid data;
the first set of physical memory locations is defective; and
the first set of physical memory locations is free to store data.

7. The system of claim 1, wherein the operations are performed as part of performing garbage collection on the memory device, and wherein the inversion refresh condition comprises a garbage collection parameter.

8. The system of claim 1, wherein the operations comprise:

in response to determining that the state of the first set of physical memory locations indicates that the first set of physical memory locations is storing valid data, performing the inversion refresh on the first set of physical memory locations by:

reading the valid data from the first set of physical memory locations;

generating inverted data based on the valid data;

writing the inverted data to a second set of physical memory locations; and updating an inversion flag associated with the second set of physical memory locations.

9. The system of claim 8, wherein the updating of the inversion flag associated with the second set of physical memory locations comprises:

reading a first value of the inversion flag associated with the first set of physical memory locations; and updating the inversion flag associated with the second set of physical memory locations to a second value, the second value being based on the first value.

10. The system of claim 1, wherein the operations comprise:

in response to determining that the state of the first set of physical memory locations indicates that the first set of physical memory locations is storing invalid data, performing the inversion refresh on the first set of physical memory locations by:

reading the invalid data from the first set of physical memory locations;

generating inverted data based on the invalid data; and writing the inverted data to a second set of physical memory locations.

11. The system of claim 1, wherein the first set of physical memory locations is a page of a block of the memory device, and each physical memory location in the first set of physical memory locations is a memory cell.

12. A method comprising:

selecting a first set of physical memory locations of a memory device based on the first set of physical memory locations satisfying an inversion refresh condition;

determining a state of the first set of physical memory locations; and based on the state of the first set of physical memory locations, performing inversion refresh on the first set of physical memory locations by:

determining that an inversion flag associated with the first set of physical memory locations is false;

based on the determining that the inversion flag associated with the first set of physical memory locations is false, writing at least one portion of an inverted version of a pre-determined data pattern to the first set of physical memory locations; and updating the inversion flag associated with the first set of physical memory locations based on a current value of the inversion flag associated with the first set of physical memory locations.

13. The method of claim 12, comprising:

selecting a second set of physical memory locations of the memory device based on the second set of physical memory locations satisfying the inversion refresh condition;

determining a state of the second set of physical memory locations; and based on the state of the second set of physical memory locations, performing inversion refresh on the second set of physical memory locations by:

determining that an inversion flag associated with the second set of physical memory locations is true;

based on the determining that the inversion flag associated with the second set of physical memory locations is true, writing at least one portion of a non-inverted version of the pre- determined data pattern to the second set of physical memory locations; and updating the inversion flag associated with the second set of physical memory locations based on a current value of the inversion flag associated with the second set of physical memory locations.

14. The method of claim 12, wherein the inversion refresh condition comprises a time since last inversion refresh of the first set of physical memory locations.

15. The method of claim 14, wherein the performing of the inversion refresh on the first set of physical memory locations comprises:
   updating the time since last inversion refresh of the first set of physical memory locations based on the state of the first set of physical memory locations.

16. The method of claim 12, wherein the selecting of the first set of physical memory locations of the memory device based on the first set of physical memory locations satisfying the inversion refresh condition comprises:
   selecting a first block of the memory device based on the first block satisfying the inversion refresh condition, the first block comprising the first set of physical memory locations.

17. The method of claim 16, wherein the inversion refresh condition comprises a time since last inversion refresh of the first block.

18. The method of claim 12, wherein the state of the first set of physical memory locations indicates at least one of:
   the first set of physical memory locations is storing valid data;
   the first set of physical memory locations is storing invalid data;
   the first set of physical memory locations is defective; or
   the first set of physical memory locations is free to store data.

19. The method of claim 12, wherein the method is performed as part of performing garbage collection on the memory device, and wherein the inversion refresh condition comprises a garbage collection parameter.

20. At least one non-transitory machine-readable storage medium comprising instructions that, when executed by a processing device, cause the processing device to perform operations comprising:
   selecting a first set of physical memory locations of a memory device based on the first set of physical memory locations satisfying an inversion refresh condition;
   determining a state of the first set of physical memory locations; and
   based on the state of the first set of physical memory locations, performing inversion refresh on the first set of physical memory locations by:
   determining whether an inversion flag associated with the first set of physical memory locations is true or false;
   in response to determining that the inversion flag is false, writing at least one portion of an inverted version of a pre-determined data pattern to the first set of physical memory locations;
   in response to determining that the inversion flag is true, writing at least one portion of a non-inverted version of the pre-determined data pattern to the first set of physical memory locations; and
   updating the inversion flag associated with the first set of physical memory locations based on a current value of the inversion flag.

* * * * *